United States Patent [19]

Olcott

[11] 4,301,111
[45] Nov. 17, 1981

[54] HORIZONTAL BLOW MOLDING
[75] Inventor: Tyler K. Olcott, Greenville, S.C.
[73] Assignee: W. R. Grace & Co., Cryovac Division, Duncan, S.C.
[21] Appl. No.: 132,201
[22] Filed: Mar. 20, 1980
[51] Int. Cl.³ .................................. B29C 17/07
[52] U.S. Cl. ............................... 264/515; 156/156; 156/244.14; 264/524; 264/529; 264/534; 264/542; 264/46.1; 425/532; 425/534
[58] Field of Search ............... 264/514, 515, 524, 529, 264/534, 542, 564, 294, 46.1; 425/532, 534; 156/156, 244.13, 244.14

[56] References Cited
U.S. PATENT DOCUMENTS 3,539,670 11/1970 Hall .................................. 264/532
3,663,672 5/1972 Button et al. .................... 264/542
3,736,201 5/1973 Teraoka ........................... 264/515 X

*Primary Examiner*—Jan H. Silbaugh
*Attorney, Agent, or Firm*—John J. Toney; William D. Lee, Jr.; Joseph P. Harps

[57] ABSTRACT

Large blow molded objects are produced by extruding a generally tubular form in a horizontal direction so as to form a large pillow shaped object upon sealing. The sealed pillow shaped article is severed and conveyed to a mold having a predetermined configuration and blow molded into a desired shape. The horizontal production of the parison used for blow molding permits the production of large parisons without the sag associated with a vertical process and also permits continuous coextrusion of large parisons without the need for complex accumulating equipment.

9 Claims, 1 Drawing Figure

HORIZONTAL BLOW MOLDING

BACKGROUND OF THE INVENTION

This invention relates generally to the art of blow molding and more particularly to the art of blow molding utilizing large parisons.

The art of blow molding has traditionally been carried out by vertically extruding a tubular form in a downward direction followed by subsequent steps of enclosing the tubular form within a mold section located immediately adjacent the extruder outlet and inflating the thus entrapped parison to form an article in substantial conformity with the mold geometry.

A problem with vertical extrusion is that as the tubular form is extruded, the weight of the extruded material begins to bear upon that material which supports it. This effect is most pronounced at the extruder orifice which bears the entire weight of the extruded material. Thus, the longer the tubular form, the greater the weight bearing upon the supporting extruded material and the greater the stretch or sag produced in the material bearing the weight. This sag tends to produce a parison which does not have a uniform cross section.

In the past, when parison weight has been sufficient to cause excessive sag, hot thermoplastic material within the extruder has been collected within an accumulator while the parison is in the process of being molded. The accumulator prevents further emission of any thermoplastic material from the die while the parison is in the forming or blow molding stage of the process. The accumulator, usually in the form of a piston and cylinder, serves the additional purpose of quickly extruding the thermoplastic material through the die orifice in order to minimize the time during which sagging can occur.

The degree of sagging which is produced during any process is to a large extent a function of the hot strength of the thermoplastic material being formed into a parison. The most desirable material is high molecular weight polyethylene because of its hot strength. Other materials, however, possess desirable attributes but have hot strength such that the utility of such materials within a blow molding process is severely limited. Materials which possess only marginal hot strength as far as a blow molding process is concerned include but are not limited to nylon, polypropylene, saran, acrylonitrile-butadiene-styrene copolymers, polycarbonates and polystyrene. These materials all present significant sagging problems.

A technique to overcome the problem of non-uniformity produced by the sagging of a tubular form is described in U.S. Pat. No. 3,759,719 to Morecroft et al. The process described therein comprises the production of a tubular form having varying cross-sectional width at the extruder outlet. The process described by Morecroft et al comprises the continual monitoring of the tubular wall thickness and constant compensation for any irregularities therein as compared to a previous setting. Such programming may be utilized so as to minimize the effects of sag produced by the weight of the extruded tubular form.

An additional problem with conventional blow molding processes is the difficulty of extruding tubular forms from materials which are thermally degradable. Such materials tend to degrade or decompose as a function of time at temperature. Normally such materials are desirably extruded from extremely streamline dies so as to minimize the residence time within the heated die. Accumulators by their very nature are nonstreamline. In attempting to accumulate thermally degradable materials, the long stay as well as the stagnant areas within the nonstreamlined construction and severe degradation make it virtually impossible to produce quality products. For this reason, only materials which are not thermally degradable have been heretofore utilized in blow molding processes utilizing accumulators.

The prior art has devised processes for producing coextruded blow molding objects. A coextrusion die useful in a blow molding process is described in U.S. Pat. No. 4,149,839 to Iwawaki et al. The vertical coextrusion process described therein utilizes a series of mandrels and piston rings surrounding rods associated with the mandrel which function to both extrude and accumulate materials within the various layers. Thermal degradation within a coextrusion die becomes a particular problem when one of the materials must of necessity be at a significantly higher temperature than the degradable material. This problem is particularly acute near the point of conversion of the two layers where the degradable material tends to remain motionless during the accumulating process.

SUMMARY OF THE INVENTION

It is thus an object of this invention to provide a process of blow molding wherein parisons of any length can be produced without the problems associated with sagging.

It is a further object of this invention to provide a process of blow molding which produces a parison of a generally uniform cross section without the need for varying the extruded wall thickness at the die orifice.

It is a further object of this invention to provide a process of blow molding wherein an accumulator within the extruder is not required.

It is a still further object of this invention to provide such a process wherein a blow molded object having several layers may be produced.

It is a still further and more particular object of this invention to provide a novel product produced by the process of this invention.

These as well as other objects are accomplished by horizontally extruding a generally tubular form, sealing and severing that form and blow molding a desired configuration from that form while maintaining the form within horizontal alignment.

BRIEF DESCRIPTION OF THE DRAWING

The single FIGURE of drawing schematically illustrates the process in accordance with this invention.

DETAILED DESCRIPTION

Figure 1:
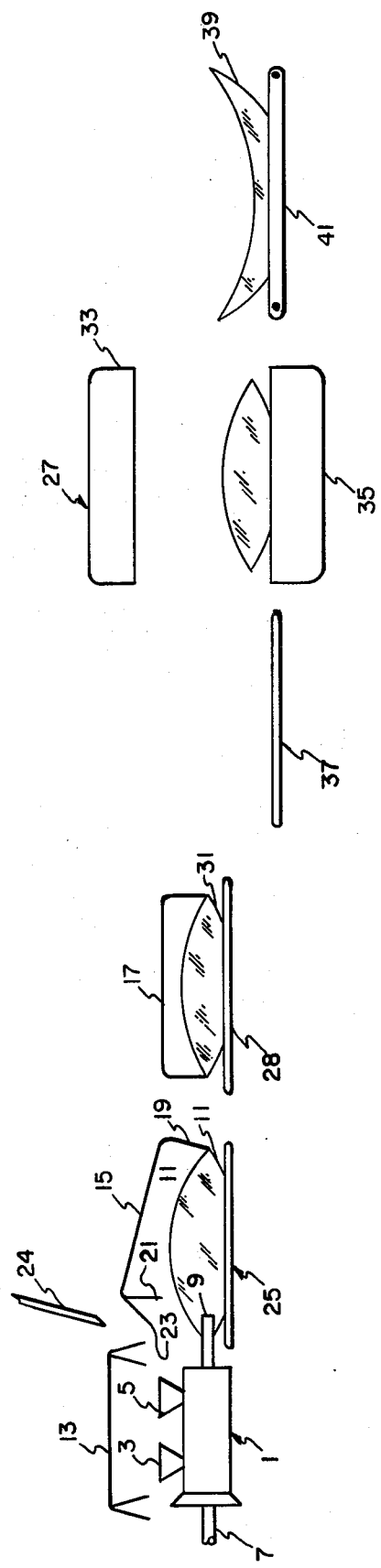

In accordance with this invention, it has been found that large parisons may be formed by horizontally extruding a tubular form which is sealed so as to form a pillow shaped article useful for subsequent blow molding into a desired shape. Horizontal extrusion so as to form a large parison permits the formation of such a parison without the problems and stresses associated with the vertical extrusion process of the prior art while also permitting the process to be carried out on a continuous basis without the need for accumulators. Since there is no need for accumulators, it is also possible to horizontally extrude and coextrude thermally degradable materials, such as saran. Further description of the process of this invention will be given with reference to the FIGURE of drawing which schematically illustrates the process.

Generally illustrated in the FIGURE is a process wherein moving from left to right, an extruder produces a tubular form which is sealed to form a pillow shaped article or parison. The pillow shaped article is subsequently blow molded into a desired geometry. More specifically, the FIGURE of drawing illustrates a conventional die 1 operated in a horizontal mode. Associated with the die are extruders 3 and 5 for supplying thermoplastic resins to the die 1. Two extruders are utilized when the die 1 is a coextrusion die. Such extruder and die may be of the type described in U.S. Pat. No. 4,149,839 without the accumulator shown therein. The die has associated therewith a source of pressurized gas 7 which communicates with the interior of the extruded parison at 9. The source of pressurizing fluid is preferably air and is injected into the parison 11 to an extent sufficient to prevent the opposite sides from collapsing and adhering to one another.

The tubular form is preferably gripped by a gripping mechanism illustrated as 13, 15 and 17 within the FIGURE of drawing. The gripper 15 is illustrated attached to the pillow shaped article or parison being formed immediately adjacent the die. Front portion 19 of gripper 15 attached to the pillow shaped article at its leading end while the following gripping sections 21 and 23 await the appropriate positioning of pillow shaped article 11 prior to descending and gripping the rear section of the appropriate parison. The gripping mechanism 17 is shown in the forwarding position once the front and rear gripping sections have engaged the pillow shaped article. Gripping mechanism 13 is shown following the gripping mechanism 15 and will engage the pillow shaped article 11 immediately behind the section gripped by sections 21 and 23 and combined with severing mechanism 24 will sever the parison between gripping mechanisms 13 and 15. Suitable gripping mechanisms are described in U.S. Pat. No. 3,539,670.

The pillow shaped article 11 is moved along a sliding surface 25 which is preferred to a belt type conveyor. It has been found that when utilizing high density polyethylene as a thermoplastic material for the parison that a silicone rubber maintained at the same temperature as the parison permits sliding without causing a wrinkling or crazing of the parison surface. The use of silicone rubber as a sliding surface for a thermoplastic high density polyethylene material constitutes an embodiment of this invention and is surprising within itself since heretofore no suitable materials were known which could be utilized to slideably contact tacky polyethylene without adversely affecting the surface thereof.

The parison is moved along the conveying surface by the gripping mechanism as the parison is being extruded from the die. Once the parison is of suitable or predetermined length, the entire surface 25 is conveyed to a blow molding station illustrated at 27. The surface 28 illustrates a pillow shaped article 31 intermediate the extruding die and the blow molding station 27. It is understood that the advantage of this invention is maintained so long as the pillow shaped article maintains its horizontal alignment. Thus, the conveying surface may be moved vertically so long as the parison maintains a generally horizontal alignment.

Ideally the conveying surface is moved between mold sections 33 and 35 and is retracted from between the mold sections while the gripping mechanism maintains the pillow shaped article substantially stationary and permits it to nest gently into the lower mold section 35. Conveying surface 37 is shown returning to the die station to receive the next extruded parison.

Illustrated at 39 is a blow molded object after removal from the blow molding station 27. Illustrated here is a canoe which is exemplary of the size of article contemplated to be within the scope of this invention. The completed article 39 may be conveyed away on conventional means such as 41, illustrated here as an endless belt conveyor.

In carrying out the process of this invention, it is understood that it is necessary to maintain the thermoplastic material at an appropriate temperature suitable for the blow molding process. In carrying out this necessary function, semi-eliptical heating hoods may be maintained above the conveying path so as to reduce the heat loss from the thermoplastic material. The conveying surfaces illustrated at 25, 28, and 37 are ideally maintained at the temperature of the thermoplastic mass forming the pillow shaped article. For high density polyethylene, this temperature is between 300° and 400° F. Temperature maintenance is less critical for polyethylene because of its high heat capacity. Materials with low heat capacity, such as polystyrene, require closer temperature control.

Preferably, the mold sections utilized at the blow molding station 27 have incorporated therein cooling means as is conventional for molds utilized in blow molding processes. The blow molding station additionally contains a source of pressurizing fluid and a conventional blow needle for inflating the pillow shaped article upon actuation of the upper and lower mold sections into nesting engagement. The pinching and transporting mechanism preferably rests totally outside of the mold but may be nested horizontally into the lower mold during the blow molding process. The pinching and transporting mechanism is severed from the pillow shaped article upon mating of the upper mold section 33 with the lower mold section 35. As is apparent, the prior art problem of stretch or sagging during a vertical extrusion process is effectively eliminated by the horizontal extrusion process of this invention since virtually any length parison may be produced.

The problem of sagging in a vertical process is a function of many variables. Principally, however, the hot strength of the extruded material is the limiting factor as well as the time required to extrude a parison of suitable length. Geometrical factors such as the thickness of the parison wall and the outer diameter of the parison also influence the limit to which the vertical process may be utilized. The hot strength of a thermoplastic material is a function of temperature, and the hot strength at the appropriate molding temperature is the important hot strength factor. The practical limit for any particular vertical extrusion process may be determined once the variables are known. It is at this point, that the process of this invention becomes extremely useful to produce large parisons. So long as the parison wall thickness is sufficient to have strength enough to prevent opposite walls from contacting due to pull of gravity, there is virtually no limit to the length of a parison. The only critical parameter of the present invention is that sufficient pressurizing fluid be maintained within the parison to prevent opposite walls of the parison from collapsing and sticking to one another.

A particularly desirable application of the process of this invention is the production of gasoline storage tanks for utilization in vehicles employing internal combustion engines. Since no single thermoplastic material has been found to be totally satisfactory for such storage tanks, the coextrusion embodiment of this invention possesses particular utility. Additionally, such storage tanks require the use of a material which is highly inert and impervious to gasoline vapors. Generally, such materials are thermally decomposable. An example of a material possessing the requisite permeability characteristics is saran which is decomposable and generally not suitable for use in a conventional vertical blow molding process because of the time of residence within the heated die and accumulator. There is no such problem with the process of this invention. Additionally, gas tanks can be produced in a size, e.g., 20 gallons, which is difficult to produce by a vertical process because of the sagging problem associated therewith.

By the process of this invention it is possible to produce large containers from materials which would not otherwise be suitable because of the thermal decomposition. By the process of this invention, materials such as saran may be coextruded with a material which is customarily utilized within a blow molding environment such as polyethylene or ethylene/vinyl acetate copolymers. It may additionally be desirable to have other layers such as a three or four layer structure and may comprise a layer of saran sandwiched between outer layers of polyethylene. The polyethylene would give the container its desired strength and rigidity while the saran intermediate layer would provide permeation resistance to gases which may tend to otherwise penetrate polyethylene.

An alternative within the scope of this invention is to coextrude a three layer structure having an outside layer of a foamable material which foams at a temperature greater than that utilized in the extrusion and blow molding process. Examples of such foamable materials are described in U.S. Pat. No. 4,146,451 to Schirmer, commonly assigned herewith. The step of foaming is carried out by subsequently heating the blow molded article to a temperature sufficient to cause the foaming of the outer layer but not sufficient to cause the collapse of the inner layers. In such an event, the foamed outer layers act as a cushioning layer for the resulting article, such as a gas tank, so as to prevent damage to the inner layers upon impact.

It is thus seen that the process of this invention provides a technique whereby large articles may be blow molded without the stretching problem of the prior art vertical blow molding process. Additionally, the process of this invention provides a technique whereby thermally degradable materials may be blow molded without subjecting such materials to extended residence times within dies and accumulators. It is further seen that the process of this invention permits the coextrusion of such thermally degradable material. As many variations in the process will be apparent to those of skill in the art after a reading of the above specification, which is exemplary in nature, the spirit and scope of this invention is to be measured by the following appended claims.

What is claimed is:

1. A process for molding hollow objects comprising:
   horizontally extruding a tubular form onto a conveying means;
   introducing pressurizing fluid into an interior of said tubular form to support said tubular form and providing said tubular form with a first seal to form a horizontally aligned parison;
   providing said parison with a second seal;
   severing said horizontally aligned parison from said tubular form;
   conveying said horizontally aligned parison so that said conveying means and said horizontally aligned parison are located between movable mold sections;
   removing said conveying means from between said movable mold sections; and
   forming said parison into a predetermined configuration between said movable mold sections.

2. The molding process of claim 1, wherein said parison comprises high density polyethylene and is slideably conveyed across a silicone rubber surface.

3. The molding process of claim 2, further comprising maintaining said silicone rubber surface at a temperature substantially the same as a temperature of said parison.

4. The molding process according to claim 1, wherein said extruding comprises coextruding so as to provide a multi-layer tubular form.

5. The molding method of claim 4, wherein a multi-layer tubular form having a foamable outer layer is coextruded.

6. A molding process comprising:
   horizontally extruding a tubular form comprising high density polyethylene;
   introducing pressurizing fluid into an interior of said tubular form to support said tubular form and providing said tubular form with a first seal to form a horizontally aligned parison;
   slideably moving said parison across a silicone rubber surface;
   providing said parison with a second seal;
   severing said horizontally aligned parison from said tubular form;
   conveying said horizontally aligned parison to a mold; and
   forming said horizontally aligned parison into a predetermined configuration in said mold.

7. The process according to claim 6 further comprising maintaining said silicone rubber surface at a temperature substantially the same as a temperature of said parison.

8. The molding process according to claim 6, wherein said step of extruding comprises coextruding to provide a multi-layer tubular form.

9. The molding process of claim 8, wherein a multi-layer tubular form having a foamable outer layer is coextruded.

* * * * *